July 30, 1968 S. I. DURANT 3,395,387
VEHICLE WARNING DEVICE
Filed Sept. 27, 1965
FIG. 1.
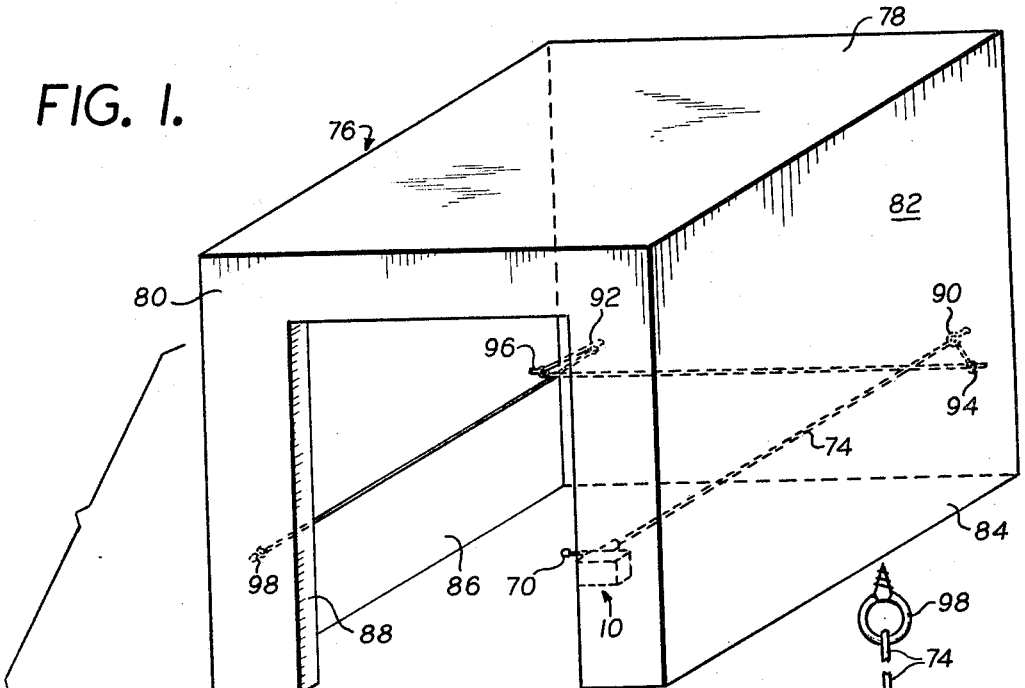
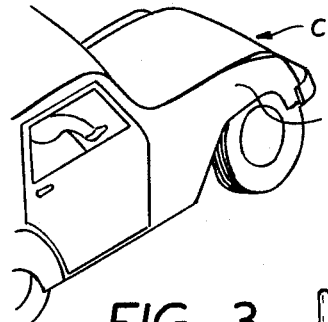
FIG. 2.
FIG. 3.
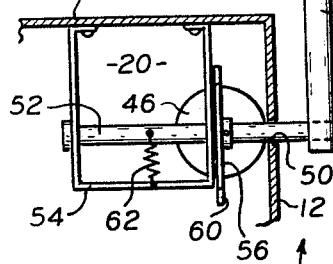
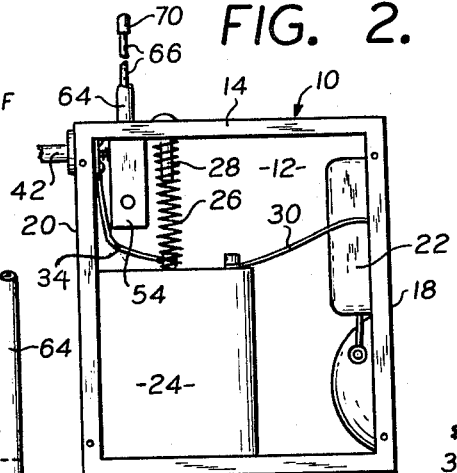
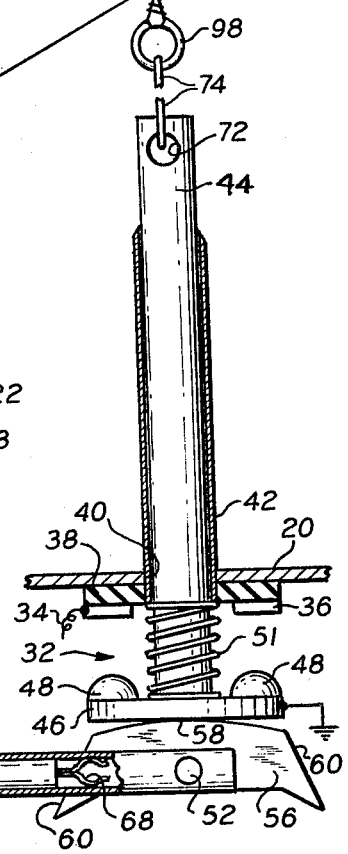
FIG. 4.
FIG. 5.
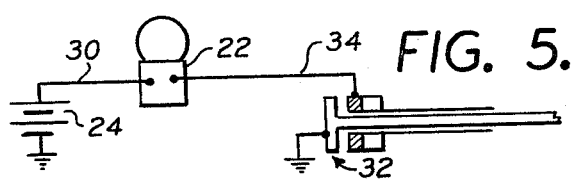
INVENTOR
SIDNEY I. DURANT
BY
Paul Fields
ATTORNEY.

ent Office 3,395,387
Patented July 30, 1968

---

3,395,387
VEHICLE WARNING DEVICE
Sidney I. Durant, 105 Radcliff Drive E.,
East Norwich, N.Y. 11732
Filed Sept. 27, 1965, Ser. No. 490,549
7 Claims. (Cl. 340—61)

ABSTRACT OF THE DISCLOSURE

A vehicle warning device including a selectively operable switch for connecting an energizing source with an alarm thereby to energize the alarm. The device includes a rod mounted adjacent the entrance of a garage and extending thereinto and a cable extending about the interior of the garage in spaced relationship to the walls of the garage. The cable and the rod are interconnected to the switch so that the movement of the rod or the tensing of the cable, as when a vehicle closely approaches the entrance or the walls of the garage, operates the switch to energize the alarm thereby signalling the driver that the vehicle is in danger of contacting the garage.

---

This invention relates generally to an alarm device and more particularly pertains to a device that is adapted to be mounted within a garage and which produces a recognizable signal when a vehicle is in danger of contacting a wall of the garage.

Normally, when the driver of a vehicle, such as an automobile, enters or leaves a garage or a similar storage area, he can easily observe the spacing between the left-hand side of the car and the garage simply by looking out of the window of the vehicle. However, it is extremely difficult for an unexperienced driver to accurately gauge the clearance between the right-hand side of the vehicle and the right-hand edge of a domestic garage entrance or the right-hand wall thereof. Even an experienced driver encounters difficulties when attempting to park a car in a garage where the design of the automobile prevents the operator from observing the right-hand fender, as where the vehicle is provided with a high hood so that the right-hand fender is below eye level. Accordingly, even a slight misjudgment of width of the operating space on the part of the driver of the vehicle when entering a garage, for example, may cause the right-hand side of the automobile to contact a portion of the garage thereby causing damage to the car, such as denting the fender, or thereby causing damage to the garage or both. Moreover, overcompensation by the driver to maintain the automobile in spaced relation to the right-hand side of the garage may result in the left-hand side of the car contacting the garage with consequent damage to the left-hand side of the vehicle or the garage or both.

Additionally, it has been found that the length of most automobiles being produced presently is slightly smaller than the length of a conventional domestic garage; consequently, the vehicle just fits within the garage. Thus, in attempting to fit the entire car within the garage many drivers contact the rear wall of the garage with the front bumper of the automobile, thereby denting the bumper and damaging the wall of the garage.

The desideratum of the present invention is to provide an alarm device that is adapted to be mounted within a garage and which produces a recognizable signal when a vehicle is in danger of making contact with a portion of the garage. Accordingly, the operator of the vehicle, upon noting the signal, may steer the automobile away from that portion of the garage, thereby preventing damage to the vehicle and the garage.

Another object of the present invention is to provide an alarm device that produces a recognizable signal when an automobile is in close proximity to the rear wall of a garage thereby to prevent injury to the front bumper of the vehicle and the rear wall of the garage.

A further object of the present invention is to provide an alarm device of the type described that is compact, easy to install, simple to maintain, and economical to produce.

Accordingly, the device of the present invention includes an alarm for producing a recognizable signal when it is energized. A switch is connected to the alarm and is selectively operable to connect an energizing source with the alarm thereby to energize the arm. The device further includes a rod movably mounted on the front wall of a garage adjacent the entrance thereof. The rod is positioned to extend into the entrance of the garage and is spaced above the bottom wall of the garage by a distance corresponding to the spacing of the widest portion of the vehicle above the bottom wall. The rod is operatively associated with the switch and is normally in a neutral position, so that when the rod is moved from the neutral position the rod closes the switch. Additionally, a cable is connected to the switch and extends about the interior of the garage in spaced relation to the walls of the garage.

Thus, if a vehicle is too close to the right-hand edge of the entrance of the garage when the vehicle is entering or leaving the premises, the closest part of the vehicle will engage and move the rod thereby to close the switch and energize the alarm to notify the driver that the vehicle is in danger of contacting the front wall of the garage. Accordingly, the operator of the vehicle may thereupon steer the car away from the aforementioned side of the garage. Moreover, the driver can maintain the automobile in spaced relation to the left-hand edge of the entrance by looking out the window of the car. If, after passing the entrance of the garage, the automobile approaches the left- or right-hand side walls of the garage, the fender will engage and tense the cable. This action causes the switch to close again to again energize the alarm. Accordingly, the operator of the vehicle corrects the direction of movement of the vehicle to move the car away from the side walls of the garage. If the car is in too close proximity to the rear wall of the garage, the front of the car will engage the cable, thereby tightening the cable and again causing the switch to close thereby to energize the alarm.

A feature of the present invention is to provide an alarm device that is adapted to be mounted within a garage and which includes means engageable by a car for producing a warning signal when the car or vehicle is in danger of contacting a wall of a garage.

The above and other advantages and objects of the present invention will become more apparent from a consideration of the following detailed description when taken in conjunction with the accompanying drawings, in which:

FIG. 1 is a perspective view of a garage illustrating an alarm device constructed according to the present invention mounted therein;

FIG. 2 is a rear elevational view of the housing portion of the device shown in FIG. 1, with the rear panel removed to show the interior of the housing;

FIG. 3 is an enlarged fragmentary vertical sectional view through a portion of the housing, illustrating the switch and the associated operating mechanism as seen from the right side;

FIG. 4 is an enlarged fragmentary top plan view, with parts broken away, of the housing portion of the device illustrated in FIG. 1;

FIG. 5 is a schematic circuit wiring diagram of an alarm device constructed in accordance with the present invention.

The drawings are substantially to scale of a working model of the invention. Like numbers in the various figures indicate identical elements.

The device of the present invention includes a housing, designated generally by the numeral 10 in FIG. 2 having a front wall 12, a top wall 14, a bottom wall 16, respective side walls 18 and 20, and a removable rear wall (not shown) which may be connected to the housing 10 by appropriate screws. Provided within the housing 10, and mounted on the side wall 18 by any conventional means, is an alarm 22 in the form of an electrically operable bell. Supported on the bottom wall 16 of the housing is an energizing source 24 which may be a conventional dry cell battery. The source is maintained in position by a biasing spring 26 that extends between the top wall 14 and the top surface of the battery 24. A removable stud 28 depends from the top wall 14 of the housing 10 and is axially received within the spring 26 and maintains the spring in position. A lead 30 connects one terminal of the source 24 to the alarm 22. As shown in FIG. 5, the other terminal of the source 24 is connected to ground. The other terminal of the alarm 22 is connected to one terminal of a two-terminal switch 32 by a lead 34. The other terminal of the switch 32 is connected to ground.

More particularly, as shown in FIG. 4, the switch 32 comprises a washer 36 made of metal or a similar current conducting material, that is connected to the lead 34 as by soldering. The washer 36 is supported on the side wall 20 of the housing 10 by an insulating washer 38 with the central opening in the washer 36 in registry with the central opening in the washer 38; however, the diameter of the opening in the washer 36 is greater than the diameter of the opening in the washer 38. The washer 36 may be affixed to the washer 38 and the washer 38 may be affixed to the wall 20 as by cementing the elements together. Provided in the wall 20 is an aperture 40 that is in registry with the central opening in the washers 38 and 36. Fixedly received within the aperture 40 and the hole in the washer 38 is a laterally extending hollow sleeve 42 that projects beyond the wall 20 of the housing. Slideably received within the sleeve 42 is a shaft 44 that terminates within the housing 10 in a circular disc or plate 46 made of a conducting material, that has a diameter substantially equal to the diameter of the washer 36. Provided on the surface of the plate 46 facing the washer 36 are integral lateral projections 48 that are adapted to contact the washer 36. The plate 46 is connected to ground so that when the projections 48 are moved into contact with the washer 36 a complete circuit exists between the alarm 22 and the energizing source 24 thereby to actuate the alarm (FIG. 5). A spring 51 is received about the shaft 44 and bears against the plate 46 at one end and extends through the washer 36 and bears against the insulating washer 38 at the other end to bias the plate 46 away from the insulating washer 36 so that normally the switch 32 remains open. In practice, the housing 10, the sleeve 42 and the shaft 44 are made of metal so that the plate 46 need not be connected to ground by an extraneous lead but the ground return lead may comprise the housing 10 per se. When the shaft 44 is moved outwardly against the bias of the spring 51, the projections 48 on the plate 46 will engage the washer 36 to close the switch 32, thereby to actuate the alarm 22.

An aperture 50 is provided in the front wall 12 of the housing 10 adjacent the switch 32 (FIG. 3). Rotatably received within the aperture 50 is a shaft 52. Fixedly received on the wall 14 is a U-shaped member 54. Thus the shaft 52 extends through and is rotatably supported within appropriate apertures provided in the respective arms of the member 54. A cam member 56 is fixedly received on the shaft 52 intermediate the member 54 and the wall 12 and is provided with a front cam surface 58 having a substantially large radius of curvature and outwardly tapering sides 60. The cam member 56 is positioned so that the cam surface 58 rides upon the surface of the disc 46 opposite the surface having the projections 48 thereon. The distance between the shaft 52 and the sides 60 of the member 56 is greater than the distance between the shaft 52 and the farthest point on the surface 58. Accordingly, rotation of the shaft 52 in either a clockwise or counter-clockwise direction, as taken in FIG. 4, causes the cam surface 58 to engage the disc 46 and move the shaft 44 outwardly, against the bias of the spring 51, until the projections 48 contact the washer 36 thereby to close the switch 32. A spring 62 (FIG. 3) is connected between the shaft 52 and the bight of the member 54 and normally returns the shaft 52 and, therefore, the cam member 56 to a neutral position, as shown in FIG. 4, wherein the projections 48 are spaced from the washer 36.

Rotation of the shaft 52 and, therefore, rotation of the cam member 56, is effected by a hollow tube 64 that is fixedly connected to the top of the shaft and which projects laterally beyond the top wall 14 of the housing 10. The axis of the tube 64 lies in a plane perpendicular to the plane of the axis of the shaft 52. Telescopically received within the tube 64 is a rod 66 that is provided with outwardly biased spring members 68 that are adapted to bear against the inner walls of the tube 64 to maintain the rod 66 in a fixed position relative to the tube 64. Received about the end of the rod 66 is a fabric insulating cap 70.

As shown in FIG. 1, the device of the present invention is adapted to be mounted within a garage, designated generally by the numeral 76, having a top wall 78, a front wall 80, a rear wall 82, and respectively opposed side walls 84 and 86. Provided in the front wall 80 is an entrance opening 88. More specifically, the housing 10 is adapted to be mounted on the inner surface of the front wall 80 adjacent the entrance 88, as by appropriate brackets and screws, with the front wall 12 of the housing 10 uppermost so that the rod 66 and the tube 64 are located at approximately the same height as the widest portion of a car (which is, normally, just above the rear fender). The rod 66 is moved outwardly relative to the tube 64 so that the rod extends beyond the front wall 80 into the entrance 88 of the garage. The insulating cap 70 is provided so that if a car contacts the shaft 66, the car will not be scratched thereby. Provided in the rear wall 82 of the garage 76 are a pair of eye-bolts 90 and 92 respectively spaced from the side walls 84 and 86 by predetermined distances. Received within the respective side walls 84 and 86, adjacent the rear wall 82, are respective opposed eye-bolts 94 and 96 which are spaced from the rear wall 82 by a predetermined distance. In practice, the eye-bolt 90 is in alignment with the shaft 44. The cable 74 is sequentially threaded through the eye-bolts 90, 94, 92 and 96, and is connected to an eye-bolt 98 which is received in the front wall 80 adjacent the side wall 86 of the garage 76 so that the cable is taut. Accordingly, the cable 74 is movably supported in substantially parallel spaced relation to the side wall 84, the rear wall 82, and the side wall 86 of the garage 76 by the respective eye-bolts.

In operation, the operator of the vehicle C begins to drive the vehicle into the garage 76. However, if the vehicle is too close to the right-hand edge of the entrance 88, the right-hand fender F of the car will engage and rotate the rod 66 and the tube 65, thereby causing the shaft 52 to rotate and accordingly move the cam member 56 to close the switch 32 in the aforenoted manner. Hence, the alarm 22 will be energized to emit an audible sound thereby signalling the driver of the vehicle C that the car is too close to the right-hand edge of the entrance 88. Accordingly, the driver then steers the car slightly toward the left so that the vehicle C moves away from the right-hand edge of the entrance 88. After the front portion of the vehicle has passed the entrance 88, the car may approach the side wall 84 of the garage 76. In this case, the fender F will engage the cable 74 thereby tensing the cable and pulling the shaft 44 outwardly to again close the switch 32. Hence, the alarm 22 will again be energized thereby to notify the driver of the vehicle that the car or vehicle C is in danger of contacting the side wall 84 of the garage. Similarly, if the car moves too far to the left, the left-hand fender will engage the portion of the cable 74 in spaced relation to the wall 86 thereby again tensing the cable and moving the shaft 44 to close the switch 32 and complete the circuit between the source 24 and the alarm 22. Additionally, the front of the vehicle C contacts the cable 74 before contacting the rear wall 82, thereby again closing the switch 32 to signal the operator of the vehicle that the vehicle C is in close proximity to the rear wall 82 so that the driver can stop the car.

Accordingly, a device has been provided that is adapted to be mounted within a garage and which produces a recognizable signal when a vehicle is in danger of contacting a wall of the garage, thereby to prevent damage to the vehicle and the garage.

While a preferred embodiment of the invention has been shown and described herein, it will be obvious that numerous omissions, changes and additions may be made in such embodiment without departing from the spirit and scope of the present invention. For example, the device need not be provided with a portable energizing source, but may be adapted to be plugged into a house outlet. Additionally, a visual alarm, such as a light, may be provided instead of or in conjunction with the bell disclosed herein.

What is claimed is:

1. A device for preventing a vehicle from contacting at least one of the walls defining the entrance of a storage area comprising, in combination, signal means for producing a recognizable alarm when energized, a switch connected to said signal means and being selectively operable to connect an energizing source with said signal means, switch operating means, mounting means for movably mounting said switch operating means on the one wall of the storage area so that at least a portion of said switch operating means extends beyond the wall for a preselected distance and into the entrance of the storage area, said mounting means including means for maintaining said switch operating means in a predetermined position and for operating said switch when said switch operating means is moved from said predetermined position, whereby said signal means is energized when a vehicle engages and moves said switch operating means from the predetermined position, said storage area comprising an enclosed garage having opposed side walls and a rear wall, said device further including a cable connected to said switch for operating the switch when the cable is tensed, and cable positioning means adapted to be connected to the walls of the garage to movably maintain a portion of the cable in spaced relation to at least one wall of the garage, whereby said cable operates said switch to energize said signal means when a vehicle tenses said cable.

2. In an alarm device adapted to be mounted within a garage having opposed side walls, a rear wall and a front wall having an entrance therein; a housing adapted to be mounted on a front wall of the garage adjacent the entrance thereof; alarm means for producing a signal when energized; a switch connected to said alarm means and being selectively operable to connect an energizing source with said alarm means; a rod, a rod mounting means for movably mounting said rod on said housing so that said rod extends beyond the edge of the front wall of the garage into the entrance thereof; said rod mounting means including means for maintaining said rod in a predetermined position and for operating said switch when said rod is moved from said predetermined position, whereby said alarm is energized when a vehicle engages and moves said rod from the predetermined position; and a cable connected to said switch for operating said switch when the cable is tensed, and cable holding means adapted to be connected to the walls of the garage for movably supporting portions of the cable in spaced relation to the walls in the garage, whereby said switch is operated when the vehicle engages and tenses the cable.

3. In an alarm device adapted to be mounted within a garage having opposed side walls, a rear wall, and a front wall have an entrance therein; a housing adapted to be mounted on the front wall of the garage adjacent the entrance thereof; alarm means mounted on said housing for producing a recognizable signal when energized; an energizing source in said housing; a switch in said housing selectively operable to connect the energizing source with the alarm means to energize said alarm means; a rod, said rod including an extensible portion movable with respect to said housing for varying the length of said rod; rod mounting means for rotatably mounting said rod on said housing and for positioning said rod so that said rod extends beyond the edge of the front wall of the garage into the entrance; said rod mounting means including means for maintaining said rod in a predetermined position and for operating said switch when said rod is rotated from said predetermined position, whereby said alarm is energized when a vehicle engages and moves the rod from the predetermined position, and a cable connected to said switch for operating said switch when the cable is tensed; and a plurality of eyehooks adapted to be connected to the walls of the garage for movably supporting the cable so that said cable extends along one side wall, the rear wall, and the other side wall of the garage in spaced relation thereto; whereby said alarm is energized when the vehicle engages and tenses said cable.

4. An alarm device for preventing a car from contacting at least one wall of a garage having a front wall, a rear wall, and opposed side walls wherein the front wall is provided with an entrance comprising in combination a housing adapted to be mounted on the front wall of the garage adjacent the entrance thereof; signal means mounted on the housing for producing an alarm when energized; a switch in said housing selectively operable to connect said signal means with an energizing source; said switch comprising a shaft slidably received through said housing having a contact member affixed thereto, a conducting member, means for insulating mounting and positioning the conducting member on said housing whereby movement of the shaft in a first direction causes said contact member to engage said conducting member thereby operating said switch, and biasing means to maintain said contact member in spaced relation to said conducing member, a cable connected to said shaft for moving said shaft in said first direction when tensed; and cable supporting means adapted to movably support the cable in spaced relation to the side walls and the rear wall of the garage, whereby tensing of the cable by a vehicle causes said contact member to engage said conducting member.

5. A device as in claim 4, and an extensible rod, means for rotatably mounting said extensible rod on said housing and for positioning said rod to extend beyond the front wall into the entrance of the garage, said mounting means including means for maintaining said rod in a predetermined position and for operating the switch when the rod is moved from said predetermined position, whereby the alarm is energized when a vehicle engages and moves the rod from said predetermined position.

6. A device as in claim 5, wherein said mounting means comprises a shaft rotatably supported on said housing, a cam member fixedly mounted on said shaft and operatively positioned with respect to said contact member whereby movement of the shaft in clockwise and counterclockwise directions causes said cam to engage said contact member and move said contact member into engagement with said conducting member, and biasing means for biasing said rod to said predetermined position wherein said contact member is in spaced relation to said conducing member.

7. A device as in claim 6, and insulating means on the end of said rod to prevent damage to a vehicle by said rod.

References Cited

UNITED STATES PATENTS

| | | | |
|---|---|---|---|
| 2,454,896 | 11/1948 | Traub | 340—61 |
| 2,658,967 | 11/1953 | Matschke | 340—61 |

JOHN W. CALDWELL, *Primary Examiner.*

A. H. WARING, *Assistant Examiner.*